Nov. 4, 1958     K. E. CHANCE     2,858,801
ANIMAL FEEDING STRUCTURE
Filed Aug. 16, 1955     2 Sheets-Sheet 1
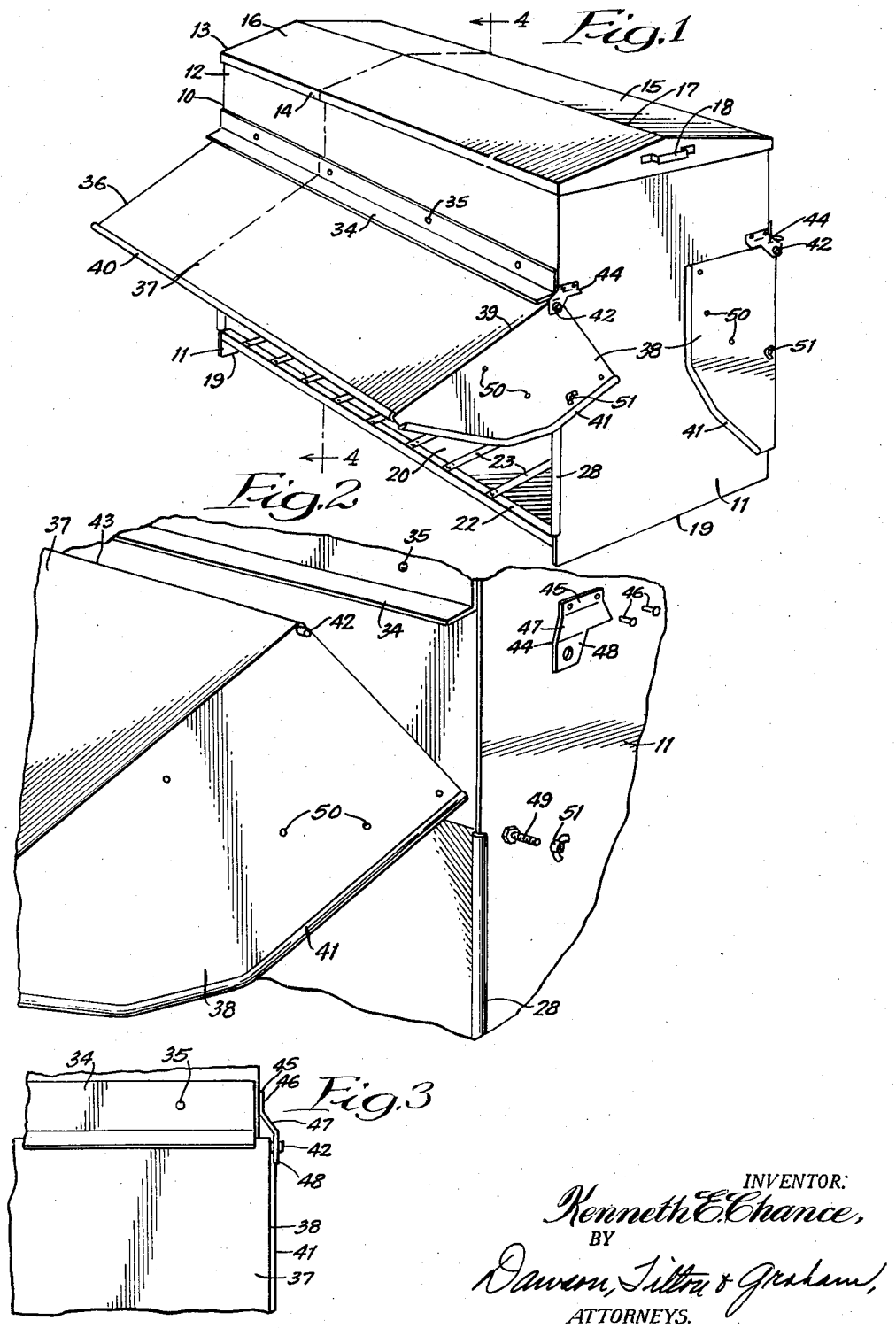
INVENTOR:
Kenneth E. Chance,
BY
Dawson, Tilton & Graham
ATTORNEYS.

Nov. 4, 1958 K. E. CHANCE 2,858,801
ANIMAL FEEDING STRUCTURE
Filed Aug. 16, 1955 2 Sheets-Sheet 2
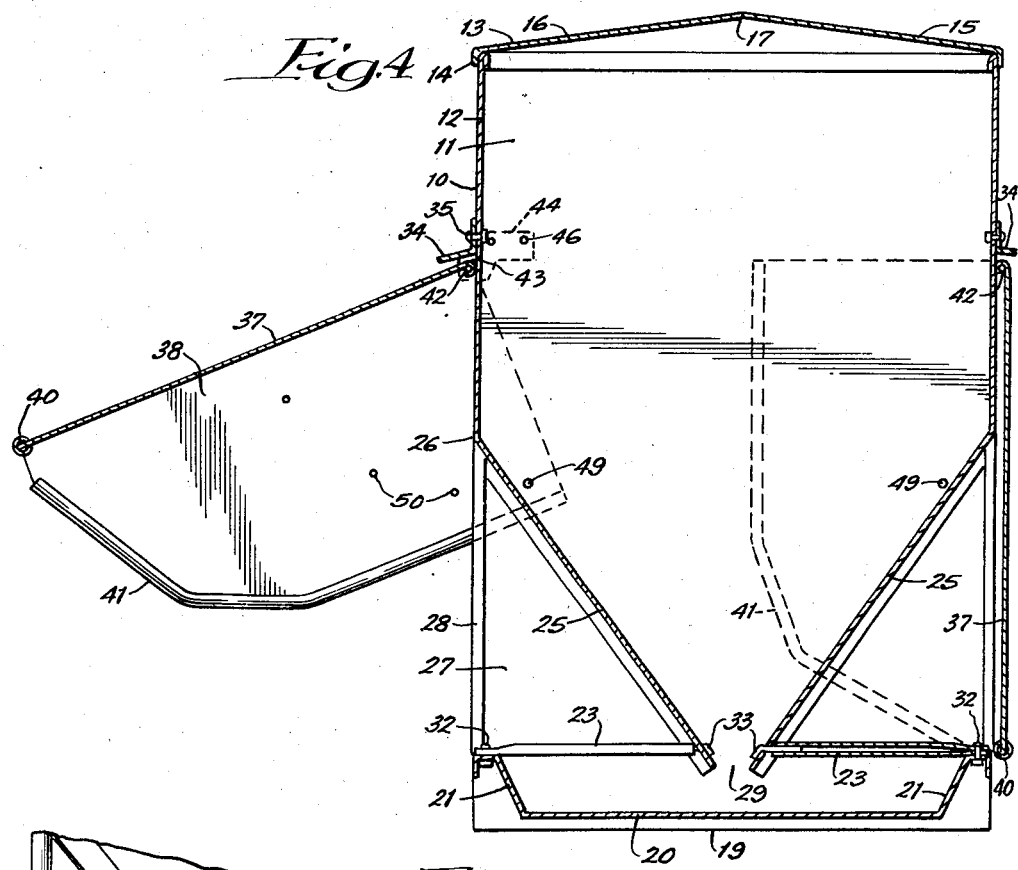
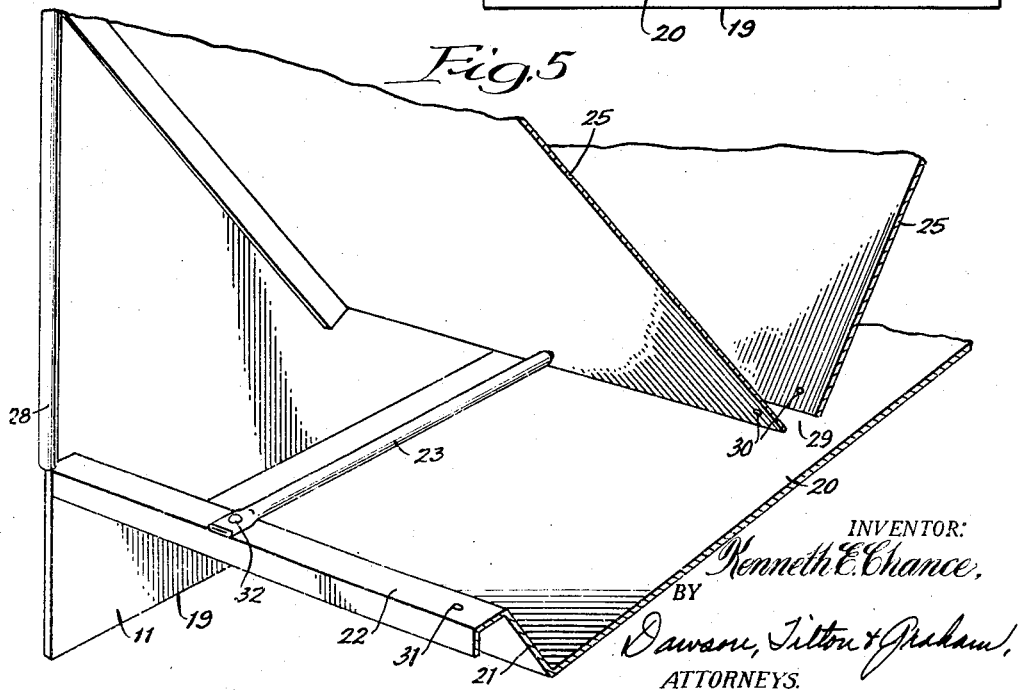
INVENTOR:
Kenneth E. Chance,
BY
Dawson, Tilton & Graham,
ATTORNEYS.

United States Patent Office 2,858,801
Patented Nov. 4, 1958

2,858,801
ANIMAL FEEDING STRUCTURE
Kenneth E. Chance, Henry, Ill.
Application August 16, 1955, Serial No. 528,708
3 Claims. (Cl. 119—52)

This invention relates to animal feeding structures, and more specifically to a structure particularly useful for the feeding of a number of animals of different sizes, such as hogs and young pigs.

A problem well known to farmers deals with the feeding of animals such as swine where the young and adult animals are intermingled in the same lot. The customary feeding trough permits hogs of all sizes to feed at the same time, with the result that the young hogs or pigs are often shoved aside by the larger animals and are not adequately fed.

A main object of the present invention, therefore, is to provide a feeding structure having adjustable means for preventing large or adult animals from being fed until after the food has been made accessible to younger or smaller animals. Another object is to provide a feeding structure having a hopper and a trough for distributing feed, and also having at least one hood which may be moved to different selected positions for limiting the size of the animals to be fed. A further object is to provide a hopper and trough structure for feeding hogs which is equipped with a pair of hinged awnings or hoods on opposite sides thereof which may be moved to closed positions, or to a plurality of selected open positions. A still further object is to provide a feeder which permits a farmer to distribute feed to small pigs in the same lot with larger hogs, and at the same time gives him even feed without the use of feed adjustments or agitators. Other objects will appear from the specification and drawings, in which:

Figure 1 is a perspective view of a hog feeder embodying the present invention; Figure 2 is an enlarged broken and exploded perspective view of my feeder showing details of the hood or awning structure; Figure 3 is an enlarged broken side elevation of the feeder; Figure 4 is a cross sectional view of the feeder taken along line 4—4 of Figure 1 showing one awning in a closed position, and another awning in an open position; and Figure 5 is an enlarged broken perspective view showing structural details of the feeder and hopper.

Referring to the drawings, Figure 1 shows an elongated animal feeder housing designated generally by the numeral 10, and equipped with end walls 11, side walls 12 and top wall or cover 13. The cover is removably mounted upon the vertical side and end walls, and has a depending flange 14 overhanging the top portions of those walls. Preferably, the cover is provided with downwardly and outwardly sloping top portions 15 and 16 which meet along a longitudinally extending ridge 17 so that rain, dust, etc., will not collect upon the cover. In addition, cover 13 is equipped with handles 18 which may be welded, as at 18a, or otherwise secured to the ends thereof.

The bottom edges 19 of the end walls or panels 11 are adapted to rest upon any level surface or foundation. Extending longitudinally between these walls and slightly above lower edges 19, is a base or bottom wall 20. The lateral edges of walls 20 are flared outwardly and upwardly to provide upwardly inclined flanges 21. The top portions of these flanges are turned laterally and then downwardly to provide longitudinally extending lips 22 which not only strengthen the feeding structure and protect animals from sharp edges, but which also furnish connecting ridges for the dividers 23.

As best shown in Figures 4 and 5, the bottom wall 20 with its upwardly flared edges provides a bin or feeding trough which extends along the entire length of the housing and may be welded or otherwise secured to end walls 11. Directly above the trough is a hopper for supplying and distributing animal feed thereto. This hopper, as seen in Figure 4, has converging side plates 25 which are preferably formed integrally with the vertical side walls 12 and angle inwardly and downwardly from the lower edges or corners 26 of those walls. The trough 20 is accessible from both sides of the feeder housing through openings 27 defined by the lower edges 25 of the vertical side walls 12, the lateral rolled edges 28 of the end walls 11, and the lips 22 of trough 20.

The inwardly and downwardly sloping side plates or walls of the hopper are spaced apart at their lower edges to provide a longitudinally extending feed discharge opening 29. Along plates 25 and adjacent the elongated discharge opening 29, are a plurality of uniformly spaced apertures 30 which are in transverse alignment with spaced apart holes 31 along the lips 22 of the trough. Dividers 23 extends between each corresponding pair of apertures and holes in the hopper and trough, respectively, and separate the trough into a plurality of feeding stations on each side of the hopper. As shown best in Figures 4 and 5, the dividers may consist of tubular sections being flattened at one of their ends and secured by rivets 32 to lips 22, and having their opposite ends carrying bent rods or pins 33 which extend through the apertures 29 of the converging hopper plates 25.

Along the entire length of the vertical side walls 12, and intermediate the upper and lower edges thereof, are mounted a pair of water deflectors or sheds 34. These deflectors consist of elongated strips having generally V-shaped cross sections. One leg of each of the V-shaped strips is joined to the side walls of the housing by any suitable means, such as by rivets 35, while the other leg of each strip extends outwardly and downwardly to deflect water, dirt, etc. away from the feeder housing.

An awning or hood 36 is hingedly mounted along each side of the feeder housing directly below the deflectors 34. As illustrated in Figure 1, each of these awnings is equipped with a side panel 37 and a pair of end panels or skirts 38, and is preferably formed from a single metallic sheet folded or bent at right angles along lines 39. To prevent injury to feeding animals, the hood may be equipped with slotted tubular segments 40 and 41 welded or otherwise secured to the outer edges of the side and end panels 37 and 38, respectively. The rolled upper edge 43 of the hood is hooked upon a horizontal bar 42, and this bar has end portions which project through the end plates or skirts 38.

Each of the hoods or awnings 36 is pivotally or swingably connected to the feeder housing 10 by means of offset hinge plates 44. Figures 2 and 3 show these plates having a top portion 45 connected to the end walls of the housing by rivets 46, an intermediate portion 47 which angles downwardly and away from the end walls 11 and a bottom portion 48 apertured to receive the projecting ends of rod 42. The awnings 36 may therefore be swung to a closed position wherein the side panels 37 extend vertically and cover the openings 27 of the housing, and to a variety of open positions wherein the side panels slope downwardly and away from the housing sides 12. To lock the awnings in selected open positions, I equip the end panels 11 of the housing with bolts 49 which are adapted to be inserted through any of the openings 50 in the series of such opening provided along each of the skirts or end panels of the awnings. While I have shown four holes or openings 50 arranged in a curved path along each skirt, it will be understood that any desired number of holes may be provided for selective adjustment and positioning of the awnings. After the awnings have been elevated to any desired position, wing nuts 51 may be threaded onto the bolts 49 to prevent detachment of the awnings after the feeder is put into operation.

It will be apparent from Figures 1 and 4 that the skirts 38 overlap the end walls 11 of the feeder housing when the awnings are in closed position, and that as the awnings are raised the amount of such overlapping is reduced but never completely eliminated. Furthermore, it is to be noted that the awnings are hingedly mounted on opposite sides of the feeder so that the skirts of these awnings swing between the lower portions 48 of the hinge plates and the end walls of the feeder, and are directed inwardly toward each other when the awnings are in closed or vertical position.

In using a feeder embodying the present invention, cover 13 is first removed and an animal feed, such as pig starter, is placed within the hopper. The awnings 36 are then pivoted about hinges 44 to any desired height and are locked in place by means of bolts 49 and wing nuts 51. Feed which has dropped through the elongated opening 29 at the bottom of the hopper falls into trough 20, and may be consumed by animals positioned at the various feeding stations defined by dividers 23. Special agitating devices to insure an even feed are unnecessary, since the animals themselves agitate the feed and cause it to fall into the trough by thrusting their snouts near, and even below, the hopper opening 29.

When large and small hogs or other animals are in the same lot, and it is desired to feed the younger or smaller animals first, the adjustable awings 36 may be swung to a lower position and again locked by refastening wing nuts 51. The most suitable positions of the hoods in any given instance depends, of course, upon the sizes of the animals to be admitted to and excluded from the feeding stations. However, it has been found that the most effective results are obtained where the awnings are lowered far enough to prevent the larger animals from squeezing their shoulders below the rounded lower edging 40 of the side panels 37. Since the lower curved edges of the end panels 38 are closer to the ground than edges 40 when the hoods are in any of the open positions which may be selected, the large animals will have even less success in reaching the food from the ends of the feeder housing. After the smaller animals have been fed, the awnings may be swung to higher positions so that larger animals may feed. In this way, it is possible for large and small animals alike to receive their proper share of the feed.

Even though the shoulders and backs of large animals cannot be squeezed beneath the rounded tubular edge 40 of side panel 37, it is possible that those animals might still try to reach the food in trough 20 by stretching their necks under the awnings 36. The size and proportions of the awnings are, therefore, important factors in providing an effective feeder. While these dimensions may vary considerably depending upon the type of animals to be fed, I have found that an awning approximately three feet in height, measured in closed position, is particularly suitable where hogs and other swine are to be fed with the present feeding structure.

In many instances, it may be desirable to pivot and lock the hoods or awnings at different elevations on each side of the feeder housing so that large and small animals may be fed at the same time on different sides of the feeding structure. Furthermore, feeding animals of different sizes on opposite sides of the feeder has the added advantage of reducing the number of adjustments in the elevation of the awnings which might otherwise be necessary.

While I have disclosed my invention in considerable detail for purposes of illustrating an embodiment thereof, it will be understood by those skilled in the art that many of these details may be varied without departing from the spirit and principles of this invention.

I claim:

1. A feeder comprising a housing having vertical side and end walls and being provided with a feeding trough therein, at least one of said side walls having a lower edge terminating a spaced distance above said trough to provide an access opening therebelow into said housing, a side awning having a side panel and a pair of end panels hingedly secured to said housing above said access opening and pivotally movable about a horizontal line extending along the upper edge of said awning and along the side wall above the lower edge thereof, said hinged awning being pivotally movable between a lowered position wherein said side panel extends along a vertical plane downwardly over said access opening to close the same and raised positions wherein said side panel slopes downwardly and outwardly away from said housing, said awning being provided with a plurality of selected positioning means and locking means provided by said housing and selectively engageable with said positioning means for securely locking said awning in any of a plurality of selected raised positions, said end panels of said awning lying along spaced vertical planes and overlapping the end walls of the housing, said end panels also having edge portions disposed below the free edge of said side panel when said awning is locked in any of said selected raised positions.

2. A feeder comprising a housing having upstanding side and end walls and being provided with a feeding trough therein, at least one of said side walls having a lower edge terminating a spaced distance above said trough to provide an access opening therebelow, a side awning comprising a side panel and a pair of end panels, said side awning being hingedly secured at its upper portion to said housing above said access opening and being swingable between a generally vertical lowered position wherein said side panel extends downwardly over said opening to close the same and raised positions wherein said side panel slopes outwardly away from said housing to provide access therebelow to said trough through said opening, said awning having a plurality of selected positioning means, and locking means provided by said housing and selectively engageable with said positioning means for locking said awning in any of a plurality of selected raised positions, said end panels of said awning overlapping said end walls when the awning is both raised and lowered and having edge portions disposed below the free edge of said side panel when the awning is locked in any of said selected raised positions.

3. The structure of claim 2 in which said positioning means comprises a plurality of spaced apart openings in each of said end panels, said locking means comprising a pair of outwardly projecting bolts secured to said end walls of said housing and insertable through each of the spaced apart openings of the overlapping end panels for selectively securing the awning in different raised positions.

References Cited in the file of this patent

UNITED STATES PATENTS

| | | |
|---|---|---|
| 478,402 | Chamberlain | July 5, 1892 |
| 596,804 | Busch | Jan. 4, 1898 |
| 1,188,274 | Holligan | June 20, 1916 |
| 1,233,213 | Fouts | July 10, 1917 |
| 1,437,462 | Belvel | Dec. 5, 1922 |
| 1,550,612 | Huber | Aug. 18, 1925 |
| 1,566,545 | Larson | Dec. 22, 1925 |
| 1,810,782 | Morris | June 16, 1931 |

FOREIGN PATENTS

| | | |
|---|---|---|
| 116,850 | Australia | Apr. 15, 1943 |